June 4, 1963 J. C. HOELLE 3,092,290
ELECTRICAL CONNECTION FOR SUBMERGED GASOLINE PUMP MOTOR
Filed Oct. 7, 1959 2 Sheets-Sheet 1

INVENTOR.
JAMES C. HOELLE,
BY
Schley, Lask & Jenkins
ATTORNEYS.

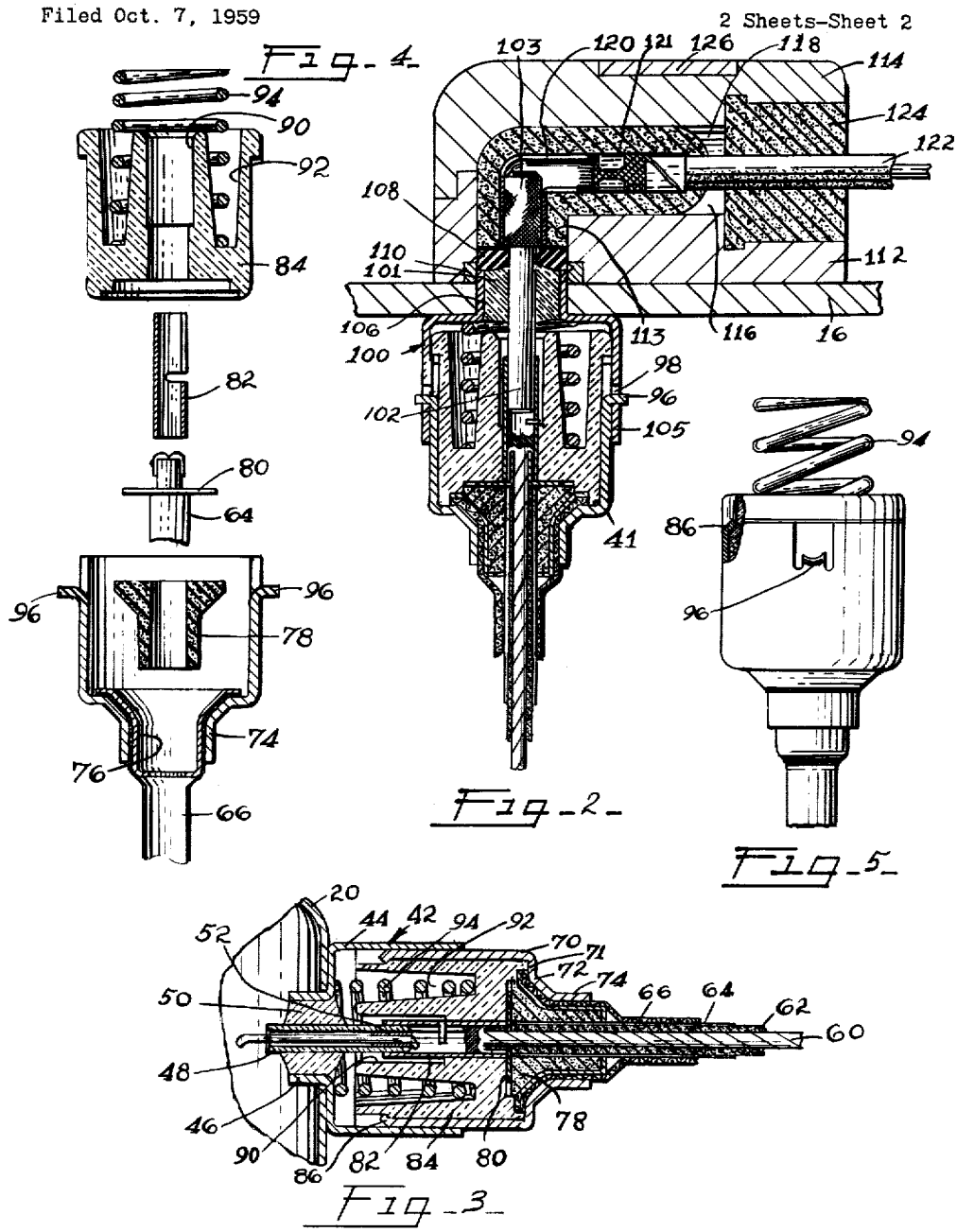

United States Patent Office 3,092,290
Patented June 4, 1963

3,092,290
ELECTRICAL CONNECTION FOR SUBMERGED GASOLINE PUMP MOTOR
James C. Hoelle, Fort Wayne, Ind., assignor to Tokheim Corporation, Fort Wayne, Ind., a corporation of Indiana
Filed Oct. 7, 1959, Ser. No. 845,027
15 Claims. (Cl. 222—76)

This invention relates to an electrical connection system for an electric motor such as the motor of a motor-pump unit mounted in a gasoline or like fuel tank, and more particularly to electrical connection means for this and like applications. This application is a continuation in part of my copending application Serial No. 775,622, filed November 11, 1958, now Patent No. 2,963,203.

U.S. Patent No. 2,885,126 shows a submerged gasoline pumping unit in which the electrical motor is housed in a closed container and drives an open pump by means of a magnetic coupling operating through an imperforate wall of the motor housing. In practice, it has been found desirable to take increasingly stringent measures to seal the motor housing. A companion application of Joseph D. Clymer, Serial No. 775,446, filed November 21, 1958, shows a motor-pump unit having a drive assembly housed in a pair of shells which are welded together to form a hermetically sealed drive assembly housing. This application relates particularly to the provision of an electrical system and connections for such a hermetically sealed electric drive unit, for use in an automotive gasoline tank; but the invention is also useful in other similar applications.

Accordingly, it is an object of the invention to provide an electric motor driven fuel system having improved electric connection means adapted to use in an environment such as the interior of an automotive gasoline fuel tank. It is a special object of the invention to provide an electrical connection means for a motor in a tank in which positive seals can be maintained between the motor housing and the tank and between the inside and outside of the tank. It is a further object of the invention to provide a cable connection which can safely be connected and disconnected in such a fuel tank, which will operate reliably in such environment, and in which the electric cable itself will be sealed and protected from attack by the fuel and from the entrance of fuel and moisture into the cable, and especially from the entrance of fuel or moisture into the interstices between the strands of a flexible multiple-strand conductor in such a cable.

In accordance with the invention as applied to a submerged gasoline fuel-pump motor having a sealed housing, the motor housing is provided with a receptacle having an outer sleeve to be connected at electrical ground potential and an inner connector prong supported and insulated therefrom, preferably by a hermetically sealing ring of fused material. The prong provides a live lead through the wall of the motor housing. The fuel tank is preferably provided with a similar receptacle, in which the prong provides a sealed live lead through the wall, for example, the cover of the tank. Electrical connection is made to the motor by a cable having an inner conductor such as a multiple-strand wire, an insulating sheath which may be protected by an outer sleeve of tough gasoline-resistant material such as nylon, and an outer conductive and protective cover, as of wire braid. Such cable is provided at at least one end, and preferably at both ends, with connector plugs engageable with the receptacles on the motor and tank. The plug comprises an outer shell for mechanically and electrically engaging the sleeve of the receptacle, and such shell is mechanically and electrically connected to the outer wire braid of the cable to form an electrical ground connection for the motor. Within the shell, the multiple-strand wire of the cable is joined to a connector prong by a joint such as a solder joint which seals the interstices between the strands, and such joint is sealed to the cable sheath, as by a resilient sealing grommet which sealingly engages both the sheath and a sealing flange on the joint. The plug prong is constructed and arranged to make electrical connection with the prong of the receptacle. A plug body supports and insulates the prong within the shell and such body desirably contains a cavity which forms an enclosure within which the plug and receptacle prongs will make contact when the plug is engaged and will break contact when the plug is withdrawn. The construction and arrangement of the parts is such that upon engagement of the plug an electrical grounding connection is first established between the shell of the plug and the sleeve of the receptacle, and an enclosure is formed about the approaching prongs before such prongs make contact, so that the electrical contact between the prongs is made (and broken) while a firm ground connection is maintained.

The plug body desirably serves to retain the sealing flange of the prong joint in engagement with the sealing grommet. The plug is desirably connected to the receptacle by a bayonet joint which is maintained tight by a spring reacting on the plug body, and the spring reaction urges the body in a direction to compress the sealing grommet into tighter sealing engagement with the prong flange and the cable sheath.

The accompanying drawings illustrate the invention. In such drawings:

FIG. 2 is a vertical section through the electrical connector fitting on the cover plate;

FIG. 3 is an axial section through the receptacle and plug connection to the motor;

FIG. 4 is an exploded view of the electrical plug and cable construction; and

FIG. 5 is a side elevation of an assembled plug, with a corner portion broken away and shown in section.

Figure 1:
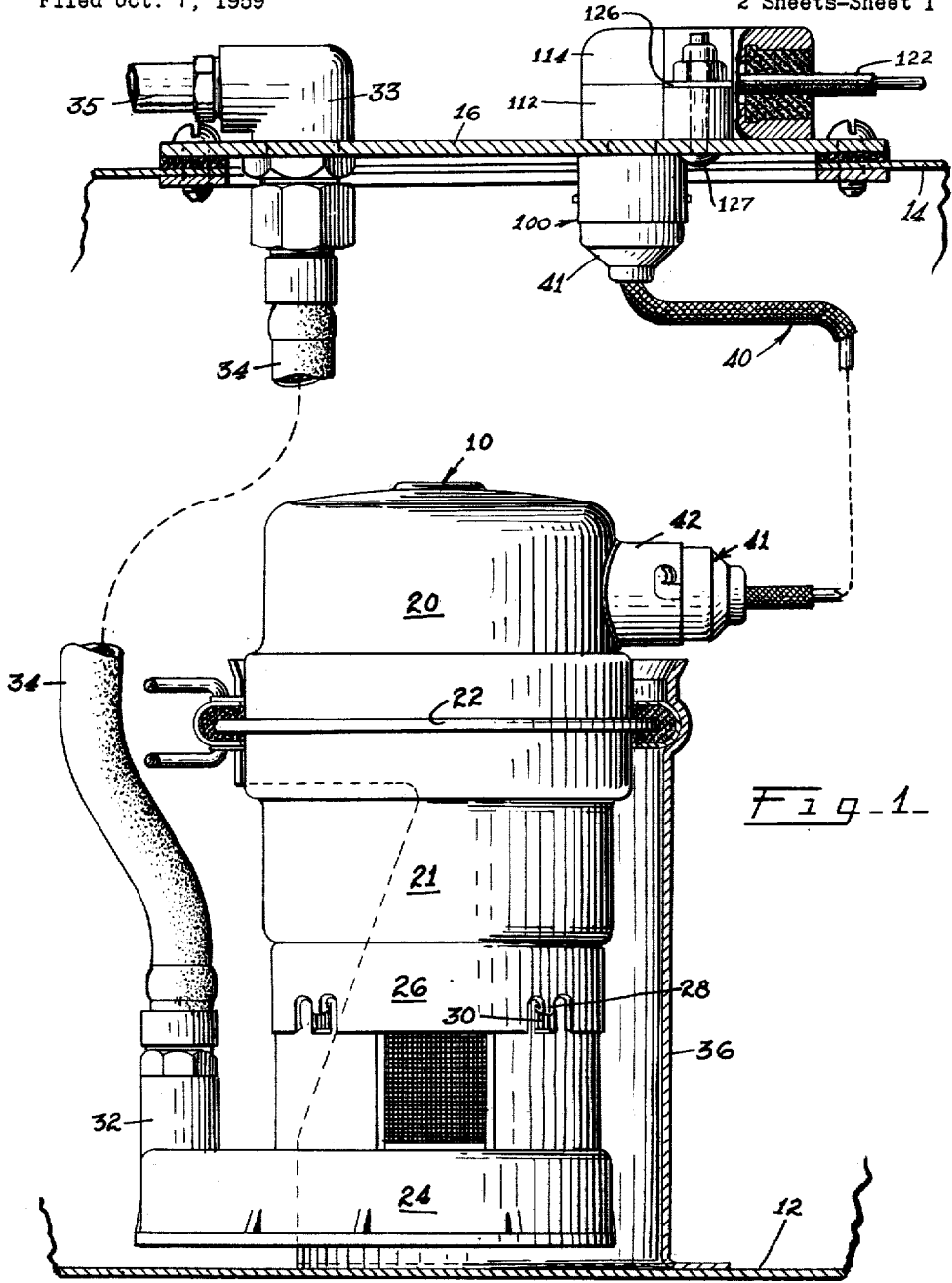
FIG. 1 is a somewhat diagrammatic view showing a gasoline fuel supply system embodying the invention and including a motor-pump unit mounted in a gasoline tank and having delivery and electrical connections through a cover plate on the top of the tank.

In the gasoline fuel supply system shown in FIG. 1, a motor-pump unit 10 is mounted in a tank 12 whose top wall 14 is provided with an access opening closed by a cover plate 16. The motor-pump unit 10 is of the type disclosed in said Clymer application Serial No. 775,446, and comprises a motor sealed within a housing comprising a pair of hat-shaped shells 20 and 21 which are completely imperforate and which have rims at their adjoining ends which are welded together to hermetically seal the motor housing and form a mounting flange 22 circumferentially about the motor housing mid-way of its height. The bottom wall of the lower hat-shaped shell 21 forms an imperforate diaphragm through which the motor is magnetically coupled to a pump assembly 24. This is secured in place below the sealed motor housing by means of a skirt 26 fixed as by welding to the lower shell 21 and provided with tongues 28 which are bent into notches 30 in spacing posts on the pump casing.

The pump discharges through a nipple 32 and a flexible hose 34 which is connected to an outlet fitting 33 leading outside the tank and here shown as mounted in the cover plate 16. The fuel line 35 is connected to this outlet fitting.

The motor-pump unit is removably mounted in a mounting stand 36 which is fixed to the bottom of the tank 12, and is releasably clamped in such stand by a circumferential clamp embracing a mounting collar received about the mounting flange 22 formed by the welded-together rims of the two shells 20 and 21. Such collar desirably includes a layer of resilient material, and it is noted that this will electrically insulate the motor housing from the stand.

The electrical connection for the motor of the motor-pump unit 10 is by means of a cable 40 having plug connectors 41 at its opposite ends, one received in a receptacle 42 on the motor and the other in a receptacle 100 carried by the cover plate 16. The motor housing receptacle 42 is shown in FIG. 3, and comprises an outer element shown as a sleeve 44 having a reduced neck 46 in which a connector prong in the form of a pin 48 is supported and hermetically sealed, as by an insulating ring of glass fused to both the pin and the sleeve. The sleeve 44 is mounted against the side of the upper shell 20 of the motor housing, with its neck 46 projecting into the motor enclosure, and is sealingly fixed in place, as by welding or soldering or both. For convenience of assembly, the pin 48 is a hollow pin, and the lead wire for the motor is passed outward through such hollow pin 48 and its outer end is secured by a solder joint 52 which seals the hollow pin 48. The receptacle sleeve 44 forms a ground lead for the motor, and the pin 48 forms a live lead extending in insulated and hermetically sealed relation through the completely and hermetically sealed motor housing.

The cable 40 consists of a central conductor 60 which is desirably in the form of a flexible twisted-strand wire. This is covered with an insulating sheath 62, desirably of an insulating material such as vinyl plastic which is relatively stable in the presence of gasoline. For further protection against the environment in a gasoline tank, the insulated wire is desirably enclosed in an outer sleeve 64, as of nylon, which is highly resistant to gasoline and to mechanical abrasion. This assembly is enclosed within a braided-wire armor covering 66 which gives mechanical protection and serves as an electrical ground connection.

The plug connector comprises an outer element shown as a shell 70 adapted to be telescopically received in the sleeve 44 of the receptacle. The shell 70 is formed to provide a shoulder 71 and a conical seat portion 72 and a reduced neck portion 74. As is best shown in FIG. 4, the outer braid 66 of the cable is expanded about an internal or thimble 76 and clamped with a press fit between such thimble and the inner surfaces of the neck 74, the conical seat 72, and the shoulder 71, desirably with the end of the braid extending beyond the radial flange of the thimble. The thimble 76 forms a seat for the reception of a resilient grommet 78 formed of an elastomer material resistant to gasoline. This is placed about the end portion of the nylon sleeve 64 and the insulating sheath 62 of the wire 60. The insulation is stripped from a projecting short length of the wire 60, and an eyelet 80 is placed over such stripped wire. Such eyelet 80 has a broad circular base which seats against the end of the insulation 62 and nylon sleeve 64, and has a central sleeve portion received about the stripped wire. The strands of the projecting end of the wire 60 are separated and bent back over the central sleeve of the eyelet 80. A terminal prong in the form of a clip 82 is then pressed over the bent-back strands and the central sleeve of the eyelet 80, and this connection is then soldered together. The resilient grommet 78 is now moved against the base flange of the eyelet 80 and the resulting end assembly is pressed into the thimble 76. The solder joint seals the interstices between the wire strands and forms a solid imperforate connection between the wire and the flange of the eyelet.

A plug body 84 is inserted in the shell 70, and held in place by crimping the shell 70 into a pair of diametrically opposite notches 86 in the body 84. The plug body 84 is of rigid insulating material, such as molded nylon. It has an inner bore which closely embraces and supports the inner end of the terminal clip 82, and has an end face which presses against the base flange of the eyelet 80. It thus serves to press the base flange against the resilient grommet 78 to retain such grommet in place and maintain sealing contact between the eyelet flange and the grommet. The grommet sealingly engages both against the flange and against the outer surface of the insulation 62 and sleeve 64 surrounding the wire 60, and completely closes the end of the wire to prevent the entrance of gasoline or moisture to the interior of the insulated wire or to the interstices between the twisted strands of the conductor 60.

The body 84 also has a central cavity 90 surrounding the free end of the terminal clip 82, and the walls of such cavity 90 extend some distance outward beyond the end of the terminal clip. The body also contains an annular socket 92 for the reception of a spring 94 which in unstressed condition stands above the end of the plug, as is shown in FIG. 5. For connecting and retaining the plug in the receptacle 42, the shell 70 is slotted at diametrically opposite points to form tongues 96 which are bent outward to form the lugs of a bayonet joint, and the sleeve 44 is provided with L-shaped notches 98 to receive and retain such lugs 96. Upon engagement of the bayonet joint, the spring 94 is compressed, and its reaction acts to maintain a firm mechanical and electrical connection between the shell 70 of the plug and the sleeve 44 of the receptacle. The spring reaction also urges the body 84 inward against the flange of the eyelet 80, and urges this against the grommet 78, to maintain the sealing function of the grommet.

The plug at the opposite end of the cable 40 is of the same construction and arrangement as described above. To receive that plug, a receptacle 100 similar to the receptacle 42 is sealingly fixed in the cover plate 16, conveniently by forming a circular boss on the shoulder wall of the receptacle and projection welding this to the cover. In the receptacle 100, the central prong is in the form of a solid pin 102 without the hole of the hollow pin 48. The receptacle 100 includes a sleeve 105 having a neck 106 extending through the cover plate 16, and the pin 102 is fixed therein by a hermetically sealing support such as a ring 101 of glass fused to the pin 102 and to the neck 106. The pin extends above the cover plate and is provided with a threaded or otherwise serrated end 103.

The receptacle 100 forms part of a connector fitting on the cover plate 16 of the fuel tank 12. Such fitting comprises a base 112 seated on the top face of the plate 16 and having an opening 113 which receives the upper portion of the neck 106 of the receptacle and forms a cavity about the upstanding serrated end 103 of the connector pin 102. A sealing grommet 108 surrounds the base of the pin end 103, and a gasket 110 lies between the cover plate 16 and the base of the fitting, to block the entrance of moisture. The upper surface of the base 112 of the fitting contains a horizontal semi-cylindrical groove 116 connecting with the opening 113 to form a seat for an insulated terminal clip 120 of a supply wire 122. Such wire is of any usual type having a central conductor and an insulating sheath. The terminal clip 120 is generally L-shaped and includes a horizontal leg which is gripped to the lead wire sheath and mechanically connected or soldered to the lead-wire conductor. The vertical leg of the clip resiliently grips the serrated end 103 of the pin 102. An insulating cover 121 is molded about the clip and forms an L-shaped body which fits in the seat 116 and opening 113 of the base 112.

A cover member 114 fits on the base 112 and defines a semi-cylindrical groove 118, which is complementary to the groove 116 and which fits over the upper surface of the insulating cover 121, to retain and form an enclosure about the terminal clip and its connection to the pin 102. The base and cover desirably have interfitting flanges about their periphery, and at one end form a socket for a sealing grommet 124 where the lead wire 122 emerges from the fitting. A strap 126 overlying the cover 114 is bolted to the tank cover plate 16 by bolts 127 and holds the terminal fitting in assembled relation and tightly against the cover plate. The bolts 127 are desirably welded to the cover plate to maintain the same as an imperforate sealed closure for the tank.

In use, the cable 40—41 may be connected to the motor-pump unit 10 and cover plate 16 either before or after the motor-pump is mounted in the tank. In making such connection, the plug 41 is inserted in the receptacle 42. Its outer shell 70 makes initial mechanical and electrical contact with the sleeve 44 of the receptacle, and the construction and arrangement of the parts is such that this connection is made before engagement occurs between the central prongs 48 and 82 of the receptacle and plug. As the plug is advanced into the receptacle, the approaching ends of the prongs are first enclosed within the outer electrically-connected metallic shell 70 and sleeve 44, and within the central cavity 90 of the plug body 84. When the prongs finally make contact, they do so only within a protective enclosure, including an outer metallic enclosure which (if the opposite end of the cable is connected) forms an electrical ground connection. A corresponding action occurs when the plug is disconnected from its receptacle, in that the central prongs break contact while their separating ends are enclosed within the cavity 90 and the electrically-connected shell 70 and sleeve 42, and while such shell and sleeve are still in mechanical and electrical contact. A similar action occurs during connection and disconnection of the plug 41 with the receptacle 100 on the cover plate.

The outer wire braid 66 of the cable provides the electrical ground connection for the motor of the motor-pump unit 10, and mechanically and electrically protects the inner supply conductor 60 and its insulation. The plug construction at the ends of the cable seal the ends of the wire 60 and its insulating sheath and sleeve 62—64, to seal out of the cable gasoline and moisture in the tank. The cable is thus isolated from the fuel tank and especially from the interior of the sealed motor casing and from the exterior of the fuel tank, so that it cannot form even a capillary passage through the sealed enclosure of the motor.

The connector fitting 112—114 on the tank may be on a fixed part of the tank or preferably on a removable cover plate as shown. Its receptacle 100 seals the tank wall with a hermetic seal, while its pin 102—103 provides an insulated conductor through such wall and its shell provides a firm ground connection to the tank. The receptacle housing 112—114 and its associated elements mechanically maintain, enclose, and protect the releasable clip connection between the lead wire 122 and the pin 102—103.

In use in operation of the automobile, the electrical connection means forms a safe electrical conductive path by way of the pins 102—103, the cable conductor 60, and the pin 48 to the hermetically sealed interior of the motor, with no chance of any leakage either between it and the tank or to the outside of the tank, and even the capillary passages in the cable conductor itself do not form a leakage path and are themselves sealed. Such safe and sealed conductive path is wholly enclosed and mechanically and electrically protected by the grounded receptacle shells and the armor braid 66.

I claim as my invention:

1. Electrical connector means for a motor-pump unit having electrical and ground leads and mounted in a fuel tank such as the gasoline tank of an automotive vehicle, comprising a tank connector fitting, an electrical cable for interconnecting said fitting and said motor-pump unit within the tank and having an inner conductor and an insulating sheath and an outer conductive cover, a connection between one end of said cable and said motor unit and a connection between the other end of said cable and said fitting, at least one of said connections being a separable plug and receptacle connection comprising outer elements respectively connected to said cable cover and to a ground lead for establishing an electrical ground connection for said unit, said plug and receptacle connection also comprising interengageable prong elements within and insulated from said outer elements and respectively connected to the inner conductor of the cable and to an electrical supply lead for establishing a live supply to said motor-pump unit, said outer elements being constructed and arranged to make initial electrical contact and to form an enclosure about the point of contact of said inner prongs prior to electrical engagement of said prongs during relative engagement movement of the plug and receptacle connection.

2. Electrical connector means for a motor-pump unit having a motor with electrical supply and ground leads and mounted in a fuel tank such as the gasoline tank of an automotive vehicle, comprising a tank fitting, an electrical cable for connecting said fitting to said unit and having an inner conductor and an insulating sheath and an outer conductive cover, a receptacle on said motor having an outer sleeve electrically connected to the motor ground and having a prong within and insulated from said ground sleeve and electrically connected to the motor supply lead, a plug on said cable for separable engagement with said receptacle, said plug comprising an outer shell for telescopic engagement with said outer receptacle sleeve, means for locking said shell and sleeve in engaged relation, said shell being mechanically and electrically connected to said conductive cable cover for physically connecting the cable to the motor and forming a ground connection for the motor, said plug also comprising a prong within and insulated from said shell and electrically engaged with said receptacle prong when said plug is engaged with said receptacle, said plug prong being connected to said cable conductor to form a supply connection for said motor, said shell and sleeve being constructed and arranged to make initial electrical contact and to form an enclosure about the point of contact of said prongs prior to electrical engagement of said prongs during engagement movement of said plug and receptacle.

3. Electrical connector means according to claim 2 in which said plug contains sealing means sealed to the cable sheath and to the cable conductor whereby to prevent the entrance of moisture therebetween.

4. Electrical connector means according to claim 2 in which said plug contains a sealing grommet sealingly surrounding the cable sheath and an eyelet sealed to the conductor of said cable, said eyelet having a flange sealingly engaging said grommet, whereby to seal the interior of the cable against the entrance of liquid.

5. Electrical connector means according to claim 4 in which the conductor is a twisted-strand wire having interstices between the strands, and said eyelet is soldered to said wire by a solder joint which seals the interstices.

6. An electric connection adapted for use in a fuel tank such as an automotive gasoline tank, comprising a receptacle having an outer sleeve and an inner prong, an electric cable having an inner twisted-strand conductor and an insulating sheath and an outer flexible conductive covering, and a plug for connecting said cable to said receptacle, said plug comprising an outer shell telescopically engageable with said sleeve, a reduced neck on said shell to which said cable cover is mechanically and electrically connected, a sealing grommet within said shell and having a central opening in which said insulating sheath is sealingly received, the cable conductor extending therebeyond, a flange mechanically connected and sealed to said conductor and having sealed relation with said grommet, whereby liquid is excluded from the interior of said sheath, a connector prong connected to said conductor, and a supporting body received within said shell and supporting said connector prong in position for engagement with said receptacle inner prong.

7. An electrical connector according to claim 6 in which said connector prong is mechanically connected to said flange, and said body engages said flange to retain the same in sealing engagement with said grommet and to secure said prong against axial displacement.

8. An electrical connector according to claim 6 in which said body forms a closely fitting cavity about said connector prong, and said plug shell and receptacle sleeve are constructed and arranged to make initial electrical contact and to position said body cavity to enclose said prongs prior to electrical engagement of said prongs during relative engagement movement of the plug and receptacle.

9. An electrical connector according to claim 6 with the addition of means to lock the receptacle sleeve and plug shell against axial separation, and a spring acting on said body in a direction to separate the same, said spring force also acting to press said body against said flange to maintain sealing engagement between the flange and grommet.

10. An electrical connector adapted for such use as in an automotive gasoline tank, comprising a receptacle having an outer sleeve and an inner prong, an electric cable having an inner multiple-strand conductor and an insulating sheath and an outer braided wire cover, and a plug for releasably connecting said cable to said receptacle, said plug comprising an outer shell telescopically engageable with said sleeve, a reduced neck on said shell, a press-fitted ferrule securing the end of said wire braid to said reduced neck, said assembly forming a conical seat at the necked end of said shell and within which the end of the cable sheath extends, a resilient grommet fitting about said sheath and seated in said seat, a connector prong and base flange secured to the end of the cable conductor with the flange seated against the grommet, and a body secured in said shell about said prong and having an end face retaining said flange and grommet in place.

11. An electric connection adapted for use in a fuel tank such as an automotive gasoline tank, comprising an electric cable having an inner conductor and an insulating sheath and an outer conductive cover, and a plug for connecting said cablet to a receptacle having an outer sleeve and an inner prong, said plug comprising an outer shell telescopically engageable with the sleeve of said receptacle, a reduced neck on said shell to which said cable cover is mechanically and electrically connected, an insulating grommet within said shell and having a central opening in which said cable sheath is sealingly received, a flange mechanically and sealingly connected to said conductor and axially positioned by said grommet in sealing engagement therewith, a connector prong connected to said conductor, and an insulating body axially retaining said flange against said grommet and supporting said connector prong within said shell in position for engagement with the prong of the receptacle, said body forming a cavity about the connector prong and extending therebeyond to enclose the point of contact of such prong with the receptacle prong, said sleeve being positioned and arranged relative to said connector prong to make initial electrical contact with the sleeve of the receptacle prior to electrical engagement of the connector prong with the receptacle prong.

12. An electric connection for a pump motor mounted in a tank, comprising a receptacle carried by a tank wall and having an inward extending sleeve and a central prong insulated and supported therein, a cable having an inner conductor and an insulating sheath and an outer conductive cover, and a plug separably connecting said cable to said receptacle and having an outer shell electrically connecting the cable cover to the receptacle sleeve and a connector prong electrically connecting the cable conductor to the receptacle prong, said receptacle prong projecting through the tank wall to form a connector stud, a fitting base sealed against said wall about stud and forming a seat, a lead-wire connector clip seated in said seat and engaged with said stud, and a fitting cover engaged over said base to enclose and secure said lead-wire clip engaged with said stud, and a mechanical means to secure the cover and base together and to the tank wall.

13. An electrical connection for a pump motor mounted in a tank, comprising a cover member for attachment to the tank, a receptacle carried by said member for receiving a motor-connecting plug, said receptacle being in the form of an outer sleeve having a reduced neck, a connector prong insulated and supported in said reduced neck by a ring of insulating material, said cover member having an opening therethrough and said receptacle being sealingly fixed to said member with its prong-supporting neck extending through said opening with the end of the prong therein exposed above said cover member, a connector-fitting base carried by said cover member about said prong end, and a connector-fitting cover for said base, said base and fitting cover defining an enclosure for the reception of a lead-wire clip engaged with said prong end, and means to retain said fitting assembled to said cover.

14. An electrical connection as defined in claim 13, in which said fitting base defines an upwardly open cavity about said prong end including a cylindrical portion substantially concentric with said prong and a seat portion extending laterally therefrom, and said fitting cover forms a downwardly open cavity complementary to said base cavity for the reception and retention of the lead-wire clip, and said base and cover also form complementary portions of a passage from the exterior to the interior of the fitting to pass the lead wire.

15. An electrical connection for use under hazardous conditions such as for a pump motor mounted in a fuel tank, comprising a receptacle having an outer sleeve and an inner axial prong in fixed insulated relation therein, an electrical cable having an inner conductor and an insulating sheath and an outer conductive and protective cover, a plug on said cable for separably connecting the same to the receptacle, said plug comprising an outer cylindrical shell telescopically engageable with said receptacle sleeve and having a shouldered portion at the cable-receiving end thereof, means mechanically and electrically connecting said cable cover to the shouldered portion of the sleeve, an insulating grommet received about the sheath of said cable within said plug and positioned for retention therein by said shouldered portion, a flange and axially extending plug prong mechanically secured and electrically connected to each other and to the conductor of said cable with the flange seated against the inner face of said grommet, said plug and receptacle prongs being telescopically engageable to electrically interconnect the same, an insulating plug body received in said shell, supporting said plug prong for engagement with said receptacle prong, and axially engaging said prong-connected flange in a direction to press the same toward the grommet and the shouldered end of the plug shell, a bayonet connection between said plug shell and said receptacle sleeve for locking the same against axial separation, and a coil spring positioned between a fixed portion of said receptacle and the plug body to thrust said body against said prong flange in a direction to separate said plug prong from said receptacle prong and to separate the plug shell from the receptacle sleeve, said prongs being relatively shorted than said shell and sleeve to cause the latter to electrically engage prior to the prongs on assembly and subsequent to the prongs on separation of said plug and receptacle.

References Cited in the file of this patent

UNITED STATES PATENTS

| | | |
|---|---|---|
| 1,304,075 | Lofgren | May 20, 1919 |
| 2,409,732 | Browne et al. | Oct. 22, 1946 |
| 2,530,357 | Kateley | Nov. 14, 1950 |
| 2,885,126 | Hudson | May 5, 1959 |

FOREIGN PATENTS

| | | |
|---|---|---|
| 1,015,896 | France | Oct. 27, 1952 |

UNITED STATES PATENT OFFICE
CERTIFICATE OF CORRECTION

Patent No. 3,092,290                                June 4, 1963

James C. Hoelle

It is hereby certified that error appears in the above numbered patent requiring correction and that the said Letters Patent should read as corrected below.

Column 3, line 62, after "internal" insert -- ferrule --; column 8, line 16, after "about" insert -- said --; column 9, line 7, for "shorted" read -- shorter --.

Signed and sealed this 17th day of December 1963.

(SEAL)
Attest:
ERNEST W. SWIDER                                    EDWIN L. REYNOLDS Attesting Officer                                      Acting Commissioner of Patents